United States Patent Office 3,455,773
Patented July 15, 1969

3,455,773
POLYACETAL LEATHER-LIKE SHEET MATERIAL AND PROCESS OF MAKING SAME
Joseph Donatien Leo Tessier, Drummondville, Quebec, Canada, assignor to Chemcell Limited-Chemcell Limitee, Montreal, Quebec, Canada
No Drawing. Filed Feb. 1, 1966, Ser. No. 523,858
Claims priority, application Great Britain, Feb. 2, 1965, 4,564/65
Int. Cl. B32b 3/26, 27/00
U.S. Cl. 161—165                    6 Claims

ABSTRACT OF THE DISCLOSURE

A leather-like sheet material of polyacetal having the form of a nearly continuous and integral matrix of interconnected ligaments of polyacetal interspersed with generally fibre-shaped void, and the process for making it which comprises (a) melt extruding as a sheet a uniform mixture of particulate isotactic polypropylene and particulate polyacetal resin in which said polyacetal is present in an amount of about 30–70% by weight and (b) removing the polypropylene by solvent extraction.

---

This invention relates to the manufacture of synthetic sheet material having leather-like characteristics and to a process for its manufacture.

In accordance with one form of the invention there is provided leather-like sheet material comprised essentially of polyacetal resin and having the form of a nearly continuous and integral matrix of interconnected ligaments and interspersed generally fibre-shaped voids.

The product may be prepared from a melt-extrudable composition consisting essentially of a substantially uniform mixture of particulate isotactic polypropylene and particulate polyacetal resin, in which the polyacetal resin is present in an amount within the range from about 30% to about 70% by weight (preferably about 40% to about 60%). The melt index of the polyacetal (at 190° C.) may be within the range of from about 1 to 20, preferably 3 to 9, and that of the polypropylene may be within the range of from about 1 to 40 and preferably 3 to 12, at 230° C. Preferably, the particle size of the polymers (which may be in the form of powder or fine flake) is within the range from about 28 and about 200 mesh. This composition is melt-extruded to form a self-supporting continuous sheet in which the polypropylene is in fibre form and the polyacetal resin in the form of a nearly continuous surrounding matrix. The sheet is then treated, for example with a suitable solvent, to remove the polypropylene and leave a self-supporting sheet made up of the matrix polyacetal resin surrounding the voids vacated by the polypropylene. The resulting sheet has characteristics including appearance and hand similar to that of leather.

The leather-like product preferably has one or more of the following additional characteristics. The bulk density is preferably within the range from about 0.4 to 0.8 gram per cc. The voids which are present are generally of a diameter less than 0.1 millimeter and the ligaments making up the matrix, measured perpendicularly to the plane of the sheet, have a diameter generally less than 0.1 millimeter. Sheets made in accordance with the invention may have a thickness of about 0.002 inch to about 0.03 inch, and the preferred thickness is within the range from about 0.003 inch to about 0.02 inch.

The strength and stiffness to bending of the sheet are generally greater in the direction of extrusion than in the direction at right angles in the plane of the sheet. Accordingly, two or more sheets may be laminated together so that each two adjacent lamina are arranged cross-grained, that is with the direction of extrusion running respectively at right angles. Such a laminated sheet will have greater strength and will have substantially equal strength and bendability in the two directions in the plane of the sheet.

The extrusion may be carried out in a plastics extruding apparatus capable of forming a sheet while minimizing the mechanical mixing of the melt and consequently minimizing its homogenization. The extruder is preferably equipped with a slot orifice which may range in thickness from about five to about fifty thousandths of an inch and may have any desired length within the capacity of the apparatus. For polypropylene and polyacetal resin, the extrusion temperature may be between about 190° C. and 240° C. with a preferred range between about 200° C. and about 225° C., i.e. somewhat lower than conventional polypropylene extrusion temperature, but higher or close to the melt extrusion temperature of the polyacetal.

It has been found that the percentage of polyacetal resin in the batch material should be within the range of about 30% and about 70% by weight. The preferred range is between about 40% and about 60% by weight. If under 30% polyacetal is used, there is a tendency for the sheet to split spontaneously upon being leached, while if over 70% is used the sheet tends to be stiff and rather brittle. The range of melt index for the two polymers which will yield acceptable mechanical properties in the product has been discussed above. The batch materials should preferably be in the form of flake or powder within the particle size mentioned. The use of coarse granulated resin tends to inhibit production of the fine structure required. It has not been found to be necessary for the sheet formed to be complete smooth as is normally the case with a single polymer, since a sheet with rough and grainy surface will still provide the final product in the required form.

The sheet ejected from the extruder goes over a chilled roll to cool it and then is wound up on a conventional mandrel. No attempt need be made to stretch or otherwise orient the sheet at this stage, although this can be done if desired.

Hot solvent extraction by any conventional means is effective to remove the polypropylene and may be carried out either batch-wise or in a continuous process. Preferred leaching is carried out with hot xylene or perchloroethylene at the boil. The temperature of the solvent is preferably kept as high as possible in order to cut down the time required and increase the efficiency of the extraction or leaching process. The yield is close to 100%. The time taken to extract sheets of up to 0.014 inch has been found to be about 1 hour.

The product resulting is a porous sheet of polyacetal resin made up of a multitude of connected elongated generally parallel ligaments interspersed irregularly by a multitude of elongated generally parallel voids. The particular structure of the porous sheet makes it possible for the sheet to be quite thick without becoming stiff in the more normal manner of heavy sheets of conventional plastics materials. The grain of this sheet may be improved by mechanical flexing in the same way as the grain and hand of leather is improved. A ribbed sheet may be produced by providing the extruding orifice with spaced-apart protuberances forming alternate relatively thick and thin parts of the extrudate.

The sheet material of the invention may be used for making clothing, wall covering, handbags and other articles normally made from leather, and book covers, or other articles for which leather-like, embossed or paper-like material is employed. The fine porous structure and relatively uniform surface makes it susceptible to dyeing, printing, or embossing.

The polyacetal resins are tough, high molecular weight materials derived by the polymerization of tri-oxane. The preparation of such materials is disclosed for example in the following United States Patents: 2,947,727 and 2,947,728, Bartz, Aug. 2, 1960; 2,951,059, Axtell Jr. et al., Aug. 30, 1960; 2,982,758, Michaud, May 2, 1961; 2,989,505 and 2,989,509, Hudgin et al., June 20, 1961; and 2,989,510, Bruni, June 20, 1961.

A ready-made mixture of the polypropylene and the polyacetal in the proper proportions can be prepared and is itself a new article of commerce. It will also be understood that the polyacetal resin can be pigmented so as to provide a coloured sheet.

The invention will be further explained in terms of the following examples giving preferred criteria.

Example I

The polymers employed were extrudable polyacetal resin and film-forming isotactic polypropylene.

The sieve analysis of the polymers was as follows, measured on Tyler standard sieves, the value in parentheses indicating the size of the sieve opening.

| Tyler sieve (percent retained on) | 48 (0.0116 inch) | 100 (0.0058 inch) | 200 (0.0029 inch) | PAN (passing 200) |
|---|---|---|---|---|
| Polypropylene ("PRO-FAX") | 2 | 67 | 29 | 2 |
| Grade M-90 "CELCON" Polyacetal resin as manufactured by Celanese Corporation of America | 0 | 3 | 36 | 61 |
| Blend 50/50 | 2 | 35 | 32 | 32 |

The melt index of the Grade M-90 "Celcon" polyacetal resin used was 9 when measured at 190° C. The melt index of the "Pro-Fax" polypropylene grade 6501 used was of the order of 3 when measured at 230° C.

Sheet material was obtained by leaching out the polyproylene component from an unoriented plastic sheet obtained by extruding a blend of 50% polypropylene flake and 50% "Celcon" ground pellets through a regular extruder. Details are as follows. The extrusion composition was prepared by mechanically blending 50 parts of "Celcon" ground pellets grade M-90 and 50 parts of stabilized "Hercules Pro-fax" polypropylene flakes. No pigment or delustrant were added. This resin blend was extruded on a one-inch Killion extruder with an L/D ratio of 20:1, fitted with a six inch die and a 0.015 inch opening. The temperature at the output end of the barrel was kept at about 430° F. The die temperature was kept at about 430° F. The extrusion rate was about five pounds per hour. The sheet was taken up on a chilled roll as it left the die at a speed of five to fifteen feet per minute. At this stage, the sheet was a grainy, translucent sheet, and fairly stiff and brittle. The sheet was boiled in xylene for thirty minutes, rinsed in hot xylene and then rinsed in acetone. It was then dried in an oven at about 100° C. temperature to remove the solvent. The sheet became opaque and pearl white and after drying was quite soft and flexible.

The sheet appeared as a nearly continuous network of ligaments when examined in cross-section, i.e. perpendicular to machine direction. The treated sheet had good strength in the machine direction, but was quite weak cross-wise where it had only a few percent extension at break. To provide a stronger web, two sheets, of the type described, were plied together at 90° with an adhesive, the sheet being arranged so that the directions of extrusion were at right angles. This provided a sheet which was fairly strong and equally strong and bendable in both directions, without appreciable loss in hand or flexibility. The binder used was a polymeric adhesive. In single layer, the sheet had a density of about 0.55 gm./cc. was quite impermeable to liquid water. It had permeability to water vapour about half that of kid leather for a corresponding thickness.

Two single sheets were also plied over a commercial synthetic non-woven fabric. The resulting sheet had similar properties.

Example II

Three extrusion runs were made with mixtures of particulate resins containing respectively 40, 50 and 60% polyacetal by weight, the rest being polypropylene. Screen analysis of the two resins was as follows:

| Tyler sieve (percent retained on) | 28 | 48 | 80 | 100 | Pan |
|---|---|---|---|---|---|
| Polypropylene | 1 | 43 | 50 | 4 | 2 |
| Polyacetal | 0 | .5 | 2.5 | 48 | 49 |

The polypropylene resin was Pro-fax as manufactured by Hercules Powder Co. and had a melt index of 2.0 when measured at 230° C. The polyacetal resin was "Celcon" M-25 as manufactured by Celanese Corporation of America with a melt index of 2.5 when measured at 190° C. The three trials were run under practically the same extrusion conditions as a 1 inch Killion extruder with an extrusion barrel having a length to diameter ratio of 20:1 fitted with a six inch die and a 0.015 inch slot opening. Temperatures and rate of extrusion were kept relatively constant for the three trials and were as follows:

| | |
|---|---|
| Feed throat temperature ° C. | 180 |
| Center barrel temperature ° C. | 235–240 |
| Die temperature ° C. | 215 |
| Rate of extrusion lb./hour | 4.5 |

The extruded sheets were cooled in air and taken up on a metallic drum. The polypropylene component was removed quantitatively by leaching in perchloroethylene for one hour at the boil.

The products resulting had the following properties.

| | Percent polyacetal resin in blend | | |
|---|---|---|---|
| | 40 | 50 | 60 |
| Sheet thickness (inch) | .006 | .007 | .014 |
| Sheet density (gr./cc.) | 0.57 | 0.57 | 0.61 |
| Calculated bulk density (gr./cc.) | 0.425 | 0.556 | 0.695 |
| Gurley stiffness: | | | |
| Machine direction | 29 | 61 | 1780 |
| Across sheet | 9 | 24 | 590 |

The experimentally found value of the bulk density for the 60% blend given in the table above is slightly less than the calculated bulk density, that is as calculated from the respective densities of the polyacetal resins (1.43 grams per cc.) and polypropylene (0.90 gram per cc.). This decrease in bulk density may be due to a certain amount of swelling taking place in the leaching process. The higher value of bulk density in the other blends may be due to collapse of the structure due to the high proportion of voids. Micophotographs taken of the product showed the voids to have a diameter generally less than about 0.1 mm. and the ligaments or lamina structure making the matrix to have a diameter generally less than about 0.1 mm. when measured perpendicularly to the plane of the sheet. As shown in the table above, the stiffness as measured on a Gurley stiffness meter showed that the sheet was more flexible if folded at right angles to the direction of extrusion. Textile materials generally have a flexibility below about 500 on a similar test so that the values found for the product having 60% polyacetal in the batch material indicate that this sample was stiffer than the usual textile fabric.

I claim:

1. A process of making a leather-like sheet material, comprising, a melt-extruding at a temperature between about 190° and 240° C. through a sheet forming die a substantially uniform mixture of particulate isotactic polypropylene having a melt index at 230° C. of from 1 to 40 and particulate polyacetal resin having a melt index at 190° C. of from 1 to 20 in which the polyacetal resin is present in an amount within the range from about 30% to about 70% by weight to form a sheet in which the polypropylene is in fibre form and the polyacetal resin in the form of a nearly continuous surrounding matrix, and removing the polypropylene from the sheet by solvent extraction thereby to leave the polyacetal matrix surrounding the voids vacated by the polypropylene.

2. A process, as defined in claim 1, in which the polymers are in the form of particulate between about 28 mesh and 200 mesh.

3. A process, as claimed in claim 1, in which the polyacetal resin is present in an amount within the range from about 40% to about 60% by weight.

4. A process, as defined in claim 1, wherein the melt index of the polyacetal measured at 190° C. is in the range of about 3 to about 9 and the melt index of the polypropylene measured at 230° C. is in the range of about 3 to about 12.

5. The product of the process of claim 1 wherein said leather-like sheet material is composed essentially of polyacetal resin having the form of a multitude of connected elongated generally parallel ligaments of the said resin interspersed irregularly by a multitude of elongated generally parallel fibre-shaped voids, said leather-like sheet material having a bulk density of 0.4 to 0.8 gram per cc., wherein the voids are generally a diameter less than 0.1 mm. and the said ligaments, measured perpendicularly to the plane of the sheet have a diameter generally less than 0.1 mm., wherein the strength and stiffness to bending of the sheet is greater in one direction in the plane of the sheet than in the direction in the plane of the sheet perpendicular to the said one direction, and said sheet having a thickness in the range of about 0.003 inch to about 0.02 inch.

6. The process comprising melt-extruding at a temperature between about 190° and 240° C. through a sheet forming die a substantially uniform mixture of particulate isotactic polypropylene having a melt index at 230° C. of from 1 to 40 and particulate polyacetal resin having a melt index at 190° C. of from 1 to 20 in the form of particulate between about 28 mesh and 200 mesh and in which the polyacetal resin is present in an amount within the range of about 40% to about 60% by weight to form a sheet in which the polypropylene is in fibre form and the polyacetal resin is in the form of a nearly continuous surrounding matrix, and removing polypropylene from the sheet by solvent extraction to produce a leather-like product of sheet material composed essentially of polyacetal resin and having the form of a nearly continuous and integral matrix of interconnected ligaments and interspersed generally fibre-shaped voids, the product having a bulk density within the range from about 0.4 to about 0.8 gram per cc. and a thickness within the range of 0.002 to 0.03 inch, the said voids being generally of a diameter less than 0.1 mm. and in which the strength and stiffness to bending of the sheet are greater in the direction of extrusion than in the direction at right angles thereto in the plane of the sheet.

References Cited
UNITED STATES PATENTS

| | | | |
|---|---|---|---|
| 2,474,201 | 6/1949 | Raymond et al. | 264—45 |
| 3,228,896 | 1/1966 | Canterino | 264—49 X |
| 3,248,271 | 4/1966 | Rielly et al. | 161—257 X |
| 3,322,613 | 5/1967 | Rasmussen | 161—252 X |

ROBERT F. BURNETT, Primary Examiner

J. D. FOSTER, Assistant Examiner

U.S. Cl. X.R.

156—77; 161—55, 168; 260—2.5; 264—49